US00RE46779E

(19) United States
(12) Reissued Patent
Norris et al.

(10) Patent Number: US RE46,779 E
(45) Date of Reissued Patent: Apr. 10, 2018

(54) ULTRA-THIN FABRIC, DEVICES, AND METHODS

(71) Applicant: ATEX Technologies, Inc., Pinebluff, NC (US)

(72) Inventors: Stephanie Booz Norris, Rocky Point, NC (US); Martin Monestere, Jr., Hollywood, SC (US); Mark Wesley Jessup, Whispering Pines, NC (US)

(73) Assignee: ATEX Technologies, Inc., Pinebluff, NC (US)

(21) Appl. No.: 15/378,268

(22) Filed: Dec. 14, 2016

Related U.S. Patent Documents

Reissue of:
(64) Patent No.: 8,911,856
Issued: Dec. 16, 2014
Appl. No.: 12/973,542
Filed: Dec. 20, 2010

U.S. Applications:
(60) Provisional application No. 61/287,989, filed on Dec. 18, 2009.

(51) Int. Cl.

| | |
|---|---|
| ***B32B 7/02*** | (2006.01) |
| ***D03D 15/00*** | (2006.01) |
| ***D03D 13/00*** | (2006.01) |
| ***D03D 1/00*** | (2006.01) |

(52) U.S. Cl.
CPC ..... *D03D 15/00* (2013.01); *D03D 1/00* (2013.01); *D03D 13/008* (2013.01); *D10B 2321/021* (2013.01); *D10B 2321/022* (2013.01); *D10B 2321/042* (2013.01); *D10B 2331/02* (2013.01); *D10B 2331/04* (2013.01); *D10B 2505/00* (2013.01); *D10B 2505/02* (2013.01); *D10B 2509/06* (2013.01); *Y10T 428/24942* (2015.01)

(58) Field of Classification Search
CPC ..... D03D 3/02; D03D 15/02; D03D 1/00; D03D 13/008; D03D 15/0061; D10B 2321/021; D10B 2321/022; D10B 2331/02; D10B 2331/04; D10B 2505/00; D10B 2505/02; D10B 2509/06; D10B 2509/08; A61F 2/82; A61F 2/06; A61F 2/07; D02H 5/02
USPC ..... 428/212, 219, 220, 332, 340; 442/203, 442/213, 218, 307, 330, 30, 351
See application file for complete search history.

(56) References Cited

U.S. PATENT DOCUMENTS

| | | | | |
|---|---|---|---|---|
| 4,191,218 | A * | 3/1980 | Clark | A61F 2/06 139/383 R |
| 5,312,677 | A * | 5/1994 | Shiojima et al. | 442/189 |
| 5,957,974 | A | 9/1999 | Thompson et al. | |
| 2004/0186589 | A1 | 9/2004 | Bentele et al. | |
| 2005/0085894 | A1 | 4/2005 | Kershner | |
| 2006/0009835 | A1 * | 1/2006 | Osborne | A61F 2/06 623/1.13 |
| 2006/0183390 | A1 | 8/2006 | Fukunishi et al. | |
| 2009/0171440 | A1 | 7/2009 | Carlson et al. | |

FOREIGN PATENT DOCUMENTS

| | | | |
|---|---|---|---|
| JP | H 4-5463 | B2 | 1/1992 |
| JP | 2004-339672 | A | 12/2004 |
| JP | 2005-118570 | A | 5/2005 |
| JP | 2008-505713 | A | 2/2008 |
| JP | 2009-013511 | A | 1/2009 |
| WO | 02/27085 | A2 | 4/2002 |
| WO | 2006/014592 | A1 | 2/2006 |

OTHER PUBLICATIONS

PCT/US2010/061291, International Search Report, dated Mar. 16, 2011.
PCT/US2010/061291, Written Opinion of the International Searching Authority, dated Mar. 16, 2011.
Japanese Opposition for a counterpart foreign application dated Apr. 21, 2016.
Japanese Office Action for a counterpart foreign application dated Oct. 15, 2014.

* cited by examiner

*Primary Examiner* — Norca L Torres Velazquez
(74) *Attorney, Agent, or Firm* — Hoffmann & Baron, LLP

(57) ABSTRACT

A fabric can comprise yarns comprising less than about 30 denier total and less than about 10 denier per filament; a density of greater than about 177 yarns per $cm^2$; and a thickness of less than about 3.2 mil. The fabric can further comprises a weight of less than about 60 $g/m^2$. The fabric can have performance characteristics equivalent to or greater than those in conventional implantable fabrics. A method of making such a fabric can include twisting together filaments into a multifilament yarn; passing adjacent yarns into a loom in parallel so as to allow the yarns to be woven together more closely; maintaining a consistent tension on the yarns during placement of the yarns on a loom beam and during weaving; and or subjecting the fabric to increased heat and pressure so as to compress the yarns more tightly.

40 Claims, No Drawings

ULTRA-THIN FABRIC, DEVICES, AND METHODS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application claims benefit of U.S. Provisional Patent App. No. 61/287,989, filed Dec. 18, 2009, which application is incorporated by reference herein in its entirety.

FIELD OF THE INVENTION

The present invention relates to an ultra-thin, high density, low denier fabric, devices including ultra-thin, high density, low denier fabric, and methods for making an ultra-thin, high density, low denier fabric.

BACKGROUND

Medical devices such as vascular and endovascular grafts and stent-grafts can include fabric components that provide various functions. For example, the fabric component of an endovascular device can function to promote sealing of the device to the lumen or structure in which it is implanted. Insertion of such devices and fabric components into target sites can require that the device and fabric component be passed through the lumen of a delivery catheter or cannula.

Conventional fabrics used for implantable medical devices generally utilize yarns having a linear density of about 40 denier or higher. As an example, a cardiovascular implant usable as a heart valve or for vessel repair can have a graft material about the perimeter of the implant that comprises 40 denier yarns. Implantable devices that include grafts having yarn densities in this range can typically be delivered through a 16-22 French catheter or higher on the French catheter scale. The French catheter scale (abbreviated as Fr) is commonly used to measure the outer diameter of cylindrical medical instruments including catheters. In the French system, the diameter in millimeters of the catheter can be determined by dividing the French size by 3. Thus, a decreasing French size corresponds with a smaller diameter catheter.

In certain medical circumstances, it may be desirable to use a smaller outer diameter catheter to deliver an implantable device. For example, it may be desirable to use a smaller diameter catheter in a patient having a smaller anatomical area through which a surgical site is accessed, such as by percutaneous means, or in a patient in which the anatomical location of repair is smaller than average. In order to utilize smaller diameter delivery catheters, the implantable devices delivered through such catheters need to be smaller as well. In particular, smaller diameter delivery catheters may require implantable devices having a smaller diameter.

Thus, there is a need for an ultra-thin fabric that can allow an implantable device to have a smaller overall diameter, thereby permitting the device to be delivered through a smaller diameter catheter. There is a need for such a fabric that can exhibit performance characteristics similar to those of thicker implantable fabrics.

SUMMARY

The present invention includes embodiments of an ultra-thin, high density, low denier fabric, devices including ultra-thin, high density, low denier fabric, and methods for making an ultra-thin, high density, low denier fabric.

In an illustrative embodiment, such a fabric can comprise yarns comprising less than about 30 denier total and less than about 10 denier per filament; a density of greater than about 177 yarns per $cm^2$; and a thickness of less than about 3.2 mil. The fabric can further comprises a weight of less than about 60 $g/m^2$. In some embodiments, the fabric can further comprises an implantable medical device. In certain embodiments, the implantable medical device is passable through a small introduction catheter usable for percutaneous insertion, for example, a 10 French or less delivery catheter. In some embodiments, the yarns can comprise multifilament yarns, and each yarn can include 10 filaments and a total denier of about 20. The yarns may comprise polyester, polypropylene, polytetrafluoroethylene, nylon, and/or polyethylene yarns. Some embodiments of the fabric can comprise a water permeability rating of less than about 400 $cc/min/cm^2$ at 120 mm Hg pressure. Some embodiments of the fabric can comprise a probe burst strength of greater than about 20 lbs. Some embodiments of the fabric can comprise a tensile strength of greater than about 25 lbs. per inch.

Some embodiments of the present invention can include a method of making the ultra-thin, high density, low denier fabric and/or devices including the ultra-thin, high density, low denier fabric. Such a method can include fabricating a fabric comprising yarns comprising less than about 30 denier total and less than about 10 denier per filament, a density of greater than about 177 yarns per $cm^2$, and a thickness of less than about 3.2 mil; and slashing the yarns with a protective coating prior to fabricating the fabric. The yarns can comprise multifilament yarns, and the method can further comprise twisting the filaments together. Some embodiments of the method can further comprise passing adjacent yarns into a loom in parallel so as to allow the yarns to be woven together more closely. Some embodiments of the method can further comprise maintaining a consistent tension on the yarns during placement of the yarns on a loom beam and during weaving. Some embodiments of the method can further comprise subjecting the fabric to increased heat and pressure so as to compress the yarns more tightly.

Features of a fabric, device, and/or method of the present invention may be accomplished singularly, or in combination, in one or more of the embodiments of the present invention. As will be realized by those of skill in the art, many different embodiments of a fabric, device, and/or method according to the present invention are possible. Additional uses, advantages, and features of the invention are set forth in the illustrative embodiments discussed in the detailed description herein and will become more apparent to those skilled in the art upon examination of the following.

DETAILED DESCRIPTION

For the purposes of this specification, unless otherwise indicated, all numbers expressing quantities, conditions, and so forth used in the specification are to be understood as being modified in all instances by the term "about." Accordingly, unless indicated to the contrary, the numerical parameters set forth in the following specification are approximations that can vary depending upon the desired properties sought to be obtained by the embodiments described herein. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the described embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, for example, 5.5 to 10. Additionally, any reference referred to as being "incorporated herein" is to be understood as being incorporated in its entirety.

As used in this specification and the appended claims, the singular forms "a," "an," and "the" include plural referents unless the context clearly dictates otherwise. Thus, for example, the term "a yarn" is intended to mean a single yarn or more than one yarn. For the purposes of this specification, terms such as "forward," "rearward," "front," "back," "right," "left," "upwardly," "downwardly," and the like are words of convenience and are not to be construed as limiting terms.

The present invention can include embodiments of an ultra-thin, high density, low denier fabric, devices including ultra-thin, high density, low denier fabric, and methods for making an ultra-thin, high density, low denier fabric.

In an illustrative embodiment, the ultra-thin, high density, low denier fabric can comprise a fabric ("wall") thickness of less than about 3.2 mil. A mil is a unit of length, in which 1 mil is equal to 0.001 inch. In some preferred embodiments, the fabric wall thickness can be about 4.0 mil. Conventional fabrics utilized in implantable medical device applications can typically have a thickness of about 4.3 mil to about 5.5 mil or greater. Thus, embodiments of the fabric of the present invention can be thinner than conventional implantable fabrics.

In some applications, for example, in a cardiovascular implant, the graft fabric can comprise the majority of the diameter of the implant device in a collapsed package for delivery through a delivery catheter. Embodiments of the ultra-thin fabric of the present invention can decrease the profile, or cross-sectional diameter, of an implantable medical device incorporating the fabric. Thus, such an ultra-thin fabric wall thickness can minimize the packing volume, and thus the capsule size, of the device so that the device can be introduced through smaller sized catheters. For example, an implantable device comprising the ultra-thin fabric having a fabric wall thickness of about 4 mil or less can be passed through delivery catheters having a size of about 10. Accordingly, as compared to a conventional implantable fabric, embodiments of the ultra-thin fabric of the present invention can provide the advantage of a smaller diameter device package that can be delivered through a smaller diameter catheter. Such an ultra-thin fabric wall thickness can be useful in providing implantable devices utilized in percutaneous and/or minimally invasive surgical applications.

In certain applications, for example, in which the ultra-thin, high density, low denier fabric comprises at least a portion of an implantable device, the device can be passed through a catheter having the same, or smaller, diameter than previously used.

In some embodiments, the ultra-thin fabric can comprise a higher density of yarns than conventional implantable medical fabrics. By utilizing more yarn per square meter in the ultra-thin fabric, the fabric density can be increased. For example, some embodiments of the fabric can comprise 177 yarns per $cm^2$. In certain embodiments, an increased amount of warp yarns, or ends, can be used to increase fabric density. In other embodiments, an increased amount of filling yarns, or picks, can be used to increase fabric density. In still other embodiments, an increased amount of both warp ends and filling picks are used to increase fabric density. Preferably, at least an increased amount of warp ends are used to increase fabric density. Utilizing lower denier yarns allows the fabric to be constructed with such an increased density, that is, a density that is higher than in conventional implantable medical fabrics.

However, due to the use of lower denier yarns, although the density of the ultra-thin fabric can be higher than in conventional implantable medical fabrics, the ultra-thin fabric can comprise a lower weight than conventional implantable medical fabrics. In some embodiments, the ultra-thin fabric can comprise a weight of less than about 60 $g/m^2$. For example, in preferred embodiments, the ultra-thin fabric can comprise a weight in the range of about 40 $g/m^2$ to about 58 $g/m^2$. In contrast, conventional implantable medical fabrics can often have a weight of greater than about 60 $g/m^2$, for example, between about 60 $g/m^2$ and about 120 $g/m^2$.

In some embodiments, the ultra-thin fabric can comprise yarns having an average linear density of less than about 30 denier total and less than about 10 denier per filament. As a result, a denser, or more tightly constructed, fabric can be fabricated. Such a denier is lower than in yarns in typical conventional implantable medical fabrics. Thus, fabric-incorporating devices having a smaller diameter can be produced such that the device can be delivered through a smaller diameter catheter, or other tubular structure. In addition, some embodiments of the ultra-thin, high density, low denier fabric can be as fluid tight as fabrics comprising higher denier yarns.

In some embodiments of the high density low denier fabric, the fabric can be fabricated by weaving, by knitting, and/or by non-woven processes. Sonic embodiments of the fabric can be a tubular fabric or a flat fabric.

Yarns useful for some embodiments of the high density low denier fabric include, for example, polyester, polypropylene, polytetrafluoroethylene (PTFE), nylon, and/or polyethylene yarns. Other yarns appropriate for implantable medical devices and that provide desired characteristics at low deniers may be utilized. In some preferred embodiments, the yarns utilized in the ultra-thin, high density, low denier fabric can be multifilament yarns. In other embodiments, the yarns can be monofilament yarns.

An implantable medical fabric that is ultra-thin and has low denier yarns can be difficult to fabricate. This is because thinner, low denier yarns can have less strength and abrasion resistance and thus be susceptible to breakage due to the stresses and strains during weaving, knitting, or other construction. Therefore, in some embodiments of the present invention, certain preparation and/or management of the yarn can help protect the yarn from such stresses and strains during manufacture.

For example, in some embodiments, the ultra-thin fabric of the present invention can comprise yarns that have undergone "slashing" prior to fabrication into the fabric. For purposes herein, "slashing" is defined as a process of sizing, or coating, yarns to protect the yarns against injury during weaving, knitting, or other construction such as during manufacture of a non-woven fabric. Such protection provides temporary strength and abrasion resistance to the yarns to enable them to resist the stresses and strains in, for example, the loom or knitting machine. In one embodiment, the yarns can be coated by immersion in the sizing material and then dried before use in the loom or knitting machine. Certain preferred sizing materials can provide enhanced protection to the yarns during weaving, knitting, or other construction.

In some embodiments, the ultra-thin fabric of the present invention can comprise yarns that have undergone "twisting" of individual filaments to make the yarn. For purposes herein, "twisting" is defined as a process of twisting an individual yarn, or combining two or more parallel singles or ply yarns by twisting together to produce a plied yarn or cord. Twisting is employed to obtain greater strength and smoothness, and increased uniformity. For example, an illustrative yarn useful for fabricating embodiments of the ultra-thin fabric can include ten filaments twisted together to make the yarn. That is, such a yarn can include ten filaments, and the total linear density of the 10-filament, twisted yarn can be about 20 denier.

In some embodiments of the ultra-thin fabric of the present invention, the flow of yarns into a loom can be controlled so as to enter the loom in parallel fashion. For example, during the process of "warping," in which yarns from individual packages of yarn are placed on a beam, multiple warp ends can be moved parallel to one another onto the beam for routing into the loom. Controlling movement of the yarns into the loom in such a manner can allow the yarns to be woven more closely together, thereby creating a denser fabric.

In some embodiments of the ultra-thin fabric of the present invention, tension on the yarn can be controlled so as to provide a consistent tension on the yarn during preparation of the yarn and/or during fabrication of the fabric. That is, yarn tension can be controlled both during "warping" and during weaving. In this way, the stresses and strains on the low denier yarns can be minimized, thereby protecting the yarn during preparation and manufacture of the ultra-thin fabric. In addition, providing a controlled, consistent tension on the yarn allows fabrication of a denser fabric.

Once an embodiment of the ultra-thin fabric has been fabricated, the fabric can be utilized in the formation of an implantable medical device. During formation of such a device, the ultra-thin fabric can be subjected to increased heat and/or pressure in a controlled manner. Such increased heat and/or pressure can compress the low denier fibers more tightly and achieve an even higher density fabric.

Such yarn preparations, management of the yarn during preparation and fabrication of the ultra-thin fabric, and controlled formation of the fabric into a device can be performed in weaving, knitting, and/or other processes. Various combinations of these and other steps can be taken to help provide a strong, flexible, and compactable ultra-thin fabric.

Some embodiments of the ultra-thin, high density, low denier fabric of the present invention can exhibit performance characteristics similar to conventional lower density fabrics having higher denier yarns.

For example, in some embodiments, the ultra-thin, high density, low denier fabric can comprise a water permeability rating of less than about 400 cc/min/cm$^2$ at 120 mm Hg pressure.

In some embodiments, the ultra-thin, high density, low denier fabric can comprise a probe burst strength of greater than about 20 lbs. Probe burst strength can be determined by pressing a probe into a one inch diameter portion of fabric and measuring the force at which the probe bursts through the fabric (in accordance with ISO 7198). Conventional implantable medical fabrics can often have a probe burst strength of about 20 lbs. or greater.

In some embodiments, the ultra-thin, high density, low denier fabric can comprise a tensile, or longitudinal, strength of greater than about 25 lbs. per inch.

Some embodiments of the present invention can include a method of making the ultra-thin, high density, low denier fabric and/or devices including the ultra-thin, high density, low denier fabric. Such a method can include fabricating a fabric comprising yarns comprising less than about 30 denier total and less than about 10 denier per filament, a density of greater than about 177 yarns per cm$^2$, and a thickness of less than about 3.2 mil; and slashing the yarns with a protective coating prior to fabricating the fabric. The yarns can comprise multifilament yarns, and the method can further comprise twisting the filaments together. Some embodiments of the method can further comprise passing adjacent yarns into a loom in parallel so as to allow the yarns to be woven together more closely. Some embodiments of the method can further comprise maintaining a consistent tension on the yarns during placement of the yarns on a loom beam and during weaving. Some embodiments of the method can further comprise subjecting the fabric to increased heat and pressure so as to compress the yarns more tightly.

Some embodiments of an ultra-thin, high density, low denier fabric according to the present invention may be utilized in implantable medical devices. For example, such ultra-thin fabrics may be utilized in cardiovascular applications, including heart valves and stent-grafts, spinal applications, cosmetic surgery, and/or general surgery. In some applications, such ultra-thin fabrics may be utilized as a barrier sheath in a prosthetic material. In other applications, such ultra-thin fabrics may be utilized as reinforcement material adapted for repairing a prosthetic graft. Certain embodiments of the implantable medical fabric according to the present invention may be utilized in any device suitable for endovascular implantation. Embodiments of such ultra-thin, high density, low denier fabric may be utilized in applications other than medical. For example, such ultra-thin fabrics may be utilized in industrial, aeronautics, telecommunications, research, and/or other applications in which a device having a fabric component is passed through, or placed in, a small diameter tubular structure and/or in which it is desirable for the device to have performance characteristics similar to those incorporating lower density and/or higher denier fabrics.

Although the present invention has been described with reference to particular embodiments, it should be recognized that these embodiments are merely illustrative of the principles of the present invention. Those of ordinary skill in the art will appreciate that an ultra-thin, high density, low denier fabric, device, and methods of the present invention may be constructed and implemented in other ways and embodiments. Accordingly, the description herein should not be read as limiting the present invention, as other embodiments also fall within the scope of the present invention.

What is claimed is:

1. A fabric, comprising:

yarns, comprising more than 1 and less than about 30 denier total and more than 0.1 and less than about 10 denier per filament;

a density of greater than about 177 yarns per $cm^2$; and a thickness of less than about 3.2 mil;

wherein the fabric further comprises a water permeability rating of less than about 400 cc/min/$cm^2$ at 120 mm Hg pressure.

2. The fabric of claim 1, wherein the fabric further comprises a weight of less than about 60 g/$m^2$.

3. The fabric of claim 1, wherein the fabric further comprises an implantable medical device.

4. The fabric of claim 3, wherein the implantable medical device is passable through a size 10 French delivery catheter.

5. The fabric of claim 1, wherein the yarns comprise multifilament yarns, each yarn having 10 filaments and a total denier of about 20.

6. The fabric of claim 1, wherein the yarns comprise polyester, polypropylene, polytetrafluoroethylene, nylon, and/or polyethylene yarns.

7. The fabric of claim 1, wherein the fabric further comprises a probe burst strength of greater than about 20 lbs.

8. The fabric of claim 1, wherein the fabric further comprises a tensile strength of greater than about 25 lbs. per inch.

9. A method, comprising:

fabricating a fabric comprising less than about 30 denier total and less than about 10 denier per filament, a density of greater than about 177 yarns per $cm^2$, and a thickness of less than about 3.2 mil, wherein the fabric further comprises a water permeability rating of less than about 400 cc/min/$cm^2$ at 120 mm Hg pressure; and slashing the yarns with a protective coating prior to fabricating the fabric.

10. The method of claim 9, the yarns comprising multifilament yarns, the method further comprising twisting the filaments together.

11. The method of claim 9, further comprising passing adjacent yarns into a loom in parallel [so as to allow the yarns to be woven together more closely].

12. The method of claim 9, further comprising maintaining a [consistent] tension on the yarns during placement of the yarns on a loom beam during weaving.

13. The method of claim 9, further comprising [subjecting the fabric to increased heat and pressure so as to compress] *compressing* the yarns [more tightly].

14. A fabric comprising:

yarns [comprised of] *selected from* the group consisting [essentially] of polyester, nylon, polypropylene, polyethylene, and polytetrafluoroethylene, the yarns comprising less than about 30 denier total and less than about 10 denier *per* filament;

a density of greater than about 177 yarns per $cm^2$; and a thickness of less than about 3.2 mil;

wherein the fabric further comprises a water permeability rating of less that about 400 cc/min/$cm^2$ at 120 mm Hg pressure.

15. The fabric of claim 14, wherein the fabric further comprises a weight of less than about 60 g/$m^2$.

16. The fabric of claim 14, wherein the fabric further comprises an implantable medical device.

17. The fabric of claim 16, wherein the implantable medical device is passable through a size 10 French delivery catheter.

18. The fabric of claim 14, wherein the fabric further comprises a probe burst strength of greater than about 20 lbs.

19. The fabric of claim 14, wherein the fabric further comprises a tensile strength of greater than about 25 lbs. per inch.

*20. An implantable medical fabric having a desired fabric construction, comprising:*

*a fabric thickness of less than about 3.2 mil;*

*a water permeability rating of less than about 400 cc/min/$cm^2$ at 120 mm Hg pressure;*

*a probe burst strength of greater than about 20 lbs.;*

*yarns having filaments, wherein the yarns have a total denier of less than about 30 denier and the filaments have a denier per filament of less than about 10;*

*wherein the yarns are selected from the group consisting of polyester, polypropylene, polytetrafluoroethylene, nylon, and polyethylene yarns.*

*21. The implantable medical fabric of claim 20, further comprising a fabric weight of less than about 60 g/$m^2$.*

*22. The implantable medical fabric of claim 21, wherein the fabric weight is from about 40 g/$m^2$ to about 58 g/$m^2$.*

*23. The implantable medical fabric of claim 20, wherein the yarns are woven to form said fabric.*

*24. The implantable medical fabric of claim 20, wherein said fabric comprises a tensile strength of greater than about 25 lbs. per inch.*

*25. The implantable medical fabric of claim 20, wherein said fabric is a tubular fabric.*

*26. The implantable medical fabric of claim 20, wherein said fabric is a flat fabric.*

*27. An endovascular device comprising the implantable medical fabric of claim 20.*

*28. The endovascular device of claim 27, wherein said endovascular device is a stent-graft.*

*29. An endovascular device comprising the implantable medical fabric of claim 20, wherein said device is selected from the group consisting of a heart valve, a barrier sheath in a prosthetic material, and a reinforcement material adapted for repairing a prosthetic graft.*

*30. The implantable medical fabric of claim 20, wherein said fabric may be utilized in cardiovascular applications, spinal applications, cosmetic surgery, and general surgery.*

*31. The implantable medical fabric of claim 20, wherein said yarns are multifilament yarns.*

*32. The implantable medical fabric of claim 31, wherein said filaments are twisted to form said multifilament yarns.*

*33. A method of making a medical fabric having a desired fabric construction comprising:*

*selecting yarns from the group consisting of polyester, polypropylene, polytetrafluoroethylene, nylon, and polyethylene yarns, said yarns having filaments, wherein the yarns have a total denier less than about 30 denier and the filaments have a denier per filament of less than about 10;*

*fabricating the medical fabric from said yarns, wherein said fabric comprises a fabric thickness of less than about 3.2 mil, a water permeability rating of less than about 400 cc/min/$cm^2$ at 120 mm Hg pressure, and a probe burst strength of greater than about 20 lbs.*

*34. The method of claim 33, further comprising fabricating the medical fabric with a fabric weight of less than about 60 g/$m^2$.*

*35. The method of claim 34, wherein the fabric weight is from about 40 g/$m^2$ to about 58 g/$m^2$.*

*36. The method of claim 33, further comprising twisting the filaments together to form said yarns.*

*37. The method of claim 33, further comprising passing adjacent yarns into a loom in parallel.*

*38. The method of claim 33, further comprising maintaining a tension on the yarns during placement of the yarns on a loom beam and during weaving.*

*39. The method of claim 33, further comprising compressing the yarns.*

*40. The method of claim 33, further comprising slashing the yarns with a protective coating prior to fabricating the medical fabric.*

* * * * *